May 14, 1963
A. M. BISHAY
3,089,957
GAMMA RADIATION DOSAGE-MEASURING
GLASSES AND METHOD OF USING
Filed Dec. 23, 1960
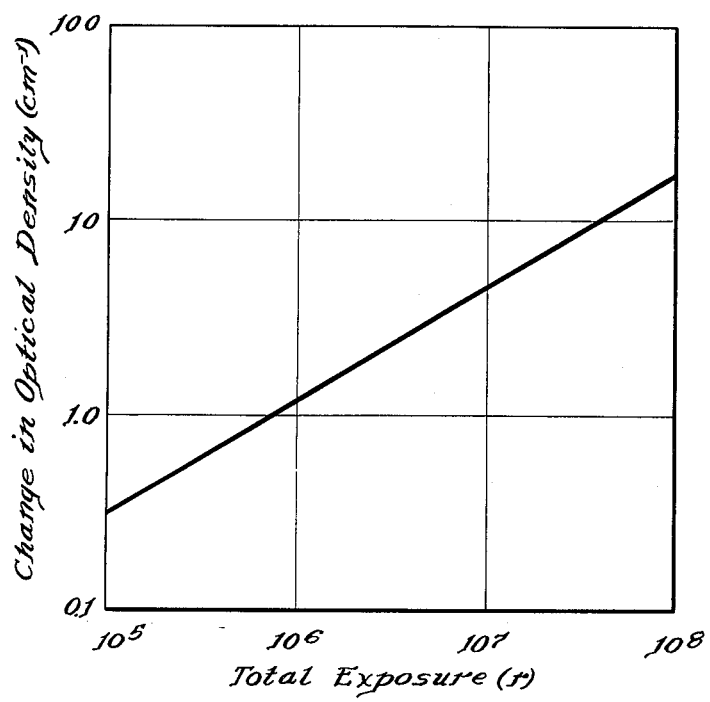
INVENTOR.
Adli M. Bishay
BY
Attorney 3,089,957
GAMMA RADIATION DOSAGE-MEASURING
GLASSES AND METHOD OF USING
Adli M. Bishay, Chicago, Ill., assignor to the United States of America as represented by the United States Atomic Energy Commission
Filed Dec. 23, 1960, Ser. No. 78,195
6 Claims. (Cl. 250—83)

The invention relates to novel glass compositions suitable for measuring dosages of gamma radiation, and to a method of using the same to measure such dosages.

Gamma radiation has many practical uses such as the sterilization of surgical goods, food sterilization, metal thickness testing, leak testing, the detection of flaws in castings and the like. In most, if not all of these, it is desirable to have an accurate, economical method of measuring the dosage, or intensity of the radiation multiplied by the time, either to control the process in question, or to make the results observed meaningful. Many different devices have been employed as dosimeters including ionization chamber counters, scintillation counters, nuclear spectrophotometers and the like; while some of these are quite accurate they are all rather complicated and expensive.

Glass dosimeters have been proposed since it has been observed that many glasses become discolored on being irradiated by gamma rays, but so far no entirely satisfactory dosimeter has been made employing this principle. There are several reasons for this when glasses now known to the art are used.

In the first place, the relation between the degree of coloration, or optical density, and the dosage received is not a linear one but something resembling a logarithmic relation so that the difference in optical density between two dosages at the larger end of the dosage scale is so slight as to be within the limits of experimental error. It would therefore be advantageous to find a dosimeter glass with a linear relation between optical density and dosage of gamma radiation received; this would not only be as precise at the larger end of the scale as at the smaller end, but it would also make for simplicity of calculations in all ranges, for greater ease of calibration of instruments, and better reproducibility of results in general.

In the second place, when glasses now known to the art are used as gamma ray dosimeters, the resulting optical density begins to fall off rather rapidly as soon as the radiation ceases due to fading of the coloration, so that the glasses have to be examined promptly by an optical density sensing device, such as a spectrophotometer, on being withdrawn from the irradiation chamber. This greatly complicates the situation as several glass specimens may arrive at the sensing device for examination at about the same time; a greater investment in spectrophotometers, or similar devices, is therefore necessary than would be the case of fading of the irradiated glasses could be slowed, or better yet, eliminated. This would make it possible to examine more specimens with fewer devices since no harm would result from postponing the examination until a slack period.

Dosimeter glass with reduced fading properties would also permit the optical density examination to be made at a distant location from the irradiator, or irradiation chamber; this would make it possible to operate a number of irradiators with a centralized examining facility to serve them all.

It is, accordingly, an object of the invention to provide a glass suitable for gamma radiation measurement which will have a linear relation between the gamma ray dosage and the optical density induced thereby.

It is another object to provide such a glass in which the induced optical density will not fall off after radiation has ceased through fading of the coloration.

It is a further object to provide a method whereby gamma radiation dosages may be economically and accurately determined.

All the foregoing objects are attained by my discovery that if, to a glass mixture containing at least 15 to about 57 mole percent of bismuth trioxide ($Bi_2O_3$), there is added a comparatively small amount of the trioxides of the class consisting of arsenic and antimony trioxides ($As_2O_3$ and $Sb_2O_3$), from about 0.05 to about 0.20 mole percent, the resulting glass, after firing, will have the desired properties for use as a dosimeter glass. On being irradiated, this glass has a distinct absorption band for photons centering at a wave length of 515 millimicrons, and the optical density at this wave length varies linearly with gamma radiation dosage, and the coloration, or optical density caused by this band, fades after radiation so much less than do other absorption bands that it gives unusually good readings. Even when the glass is heated as high as 130° C. this band is affected far less than are the other bands.

In addition to this linear, non-fading absorption band induced in my glass by gamma radiation, other absorption bands are induced at the same time, which either fade at room temperature, or can be made to fade by heating the glass, thereby substantially eliminating interference from these other bands. This will be discussed in more detail when I explain the method I have provided to make use of the dosimeter glass of my invention.

The FIGURE is a graph showing the average of changes in optical density per centimeter of thickness of five samples of my glass Si 104 (herein later described) plotted against total exposure to gamma radiation in roentgens (r.) from a cobalt 60 source giving off a known $3.468 \times 10^6$ roentgens per hour (r./h.). The optical density of the samples was determined, after heating at 130° C. to eliminate substantially the interfering absorption bands above referred to, in a Cary spectrophotometer of the standard kind by standard procedures known to the art. It will be observed that since both the ordinates and the abscissae are logarithmic, the straight line of the plot indicates the existence of a true linear relationship between gamma ray dosage and induced optical density.

While there is no reason, theoretical or otherwise, to question whether the results shown in the above graph are sufficient to establish the linear relation referred to, some additional studies were made in order to eliminate any doubt. Similar experiments on Si 104 were run using cobalt 60 sources yielding other rates of gamma radiation, $1 \times 10^5$ and $3.25 \times 10^5$ r./h., with the same results.

The same linear relationship between gamma dosage and optical density holds good for my dosimeter glasses when sources other than cobalt 60 are used. These give linear plots similar to that of the FIGURE even when the source is the complicated mixture of radiations coming from the fission products of an irradiated nuclear fuel element. Therefore, it is apparent that the linear relation referred to is independent of the rate of gamma radiation.

The glass compositions by which my invention may be carried out will now be described. Table I, which follows, gives the molar composition of a number of embodiments of the invention including the preferred composition Si 104 above-mentioned. The components are given in absolute mole units:

TABLE I

| Glass No. | $Bi_2O_3$ | $Sb_2O_3$ | $Al_2O_3$ | Molar composition | | | $SiO_2$ | $As_2O_3$ |
|---|---|---|---|---|---|---|---|---|
| | | | | $B_2O_3$ | PbO | $K_2O$ | | |
| Si 213 | 1.5 | | | 4.5 | 1.0 | | 1.0 | 0.004 |
| Si 214 | 1.5 | | | 4.5 | 1.0 | | 1.0 | 0.008 |
| Si 104 | 1.5 | | | 4.5 | 1.0 | | 1.0 | 0.016 |
| 219 | 1.5 | | | 4.5 | 1.0 | | | 0.014 |
| 218 | 1.5 | | | 4.5 | 1.0 | | | 0.007 |

Table II, which follows, gives a number of "base glass" compositions to which I have found it suitable to add materials of the class of $As_2O_3$ and $Sb_2O_3$ in order to carry out the invention, and which yield results comparable to, if not quite equal to, those of glass Si 104:

TABLE II

| Glass No. | $Bi_2O_3$ | $B_2O_3$ | PbO | $SiO_2$ | $Al_2O_3$ |
|---|---|---|---|---|---|
| 165 | 1.0 | 4.5 | 1.0 | | |
| 201 | 1.50 | 4.5 | 1.0 | | |
| 203 | 2.00 | 4.5 | 1.0 | | |
| 206 | 1.50 | 4.0 | 1.0 | | |
| 207 | 1.50 | 3.5 | 1.0 | | |
| 189 | 1.00 | 4.5 | 1.25 | | |
| 217 | 2.00 | 4.5 | 1.75 | | |
| 271 | 4.0 | 4.5 | 2.00 | | |
| Si 91 | 1.5 | 5.0 | 1.0 | 1.0 | |
| Si 92 | 1.5 | 4.5 | 1.5 | 1.0 | |
| Si 93 | 2.0 | 4.5 | 1.0 | 1.0 | |
| Si 104 | 1.5 | 4.5 | 1.0 | 1.0 | |
| 226 | 1.5 | 4.5 | | | |

To the above base glasses, whose composition is given in absolute mole units, from about 0.5 to about 2.0 mole percent of the material of the class of $As_2O_3$ and $Sb_2O_3$ are added, or in absolute moles, from about 0.004 to 0.016. $As_2O_3$ is the preferred additive.

The above list of "base" glasses is not offered to limit the scope of the invention, but to illustrate its breadth. Many other base glasses could doubtless be used so long as the bismuth trioxide content was sufficiently high. Lead oxide or silicon dioxide need not be used; however, above 57 mole percent it is practically impossible to melt pure bismuth trioxide, and therefore some other component is necessary to keep the mole percentage of the latter below this value. However, none of these considerations affect the essential part of the invention, which is only concerned with the $Bi_2O_3$ content and those of the trioxides of arsenic and antimony.

Though I do not claim to be the first to use heating as a means of stabilizing dosimeter glass after irradiation, I have found that if I heat my glass to 130° C. after irradiation all the other absorption bands will fade to the extent of about 80 percent whereas the one at about 515 m$\mu$ will fade no more than 50%. I therefore preferably heat my glass to this temperature for about one hour and find that the elimination of all but the 20 percent of the other bands reduces the interference effects from them to a point where they give no real trouble in taking optical density readings of the 515 m$\mu$ band. The fifty percent of the latter remaining is more than sufficient for this purpose.

Various explanations have been advanced to explain the unique behaviour of my glass. One of these is that the absorption band at 515 m$\mu$ is due to the presence of extremely small, finely subdivided metallic bismuth in the glass as a result of the reduction of the $Bi_2O_3$ by the $As_2O_3$ or $Sb_2O_3$ under the influence of radiation, whereas the other absorption bands and coloration are due to trapped electrons and the corresponding "holes" in the glass lattice brought about by the irradiation. The electron displacement is thought to be reversible, even at room temperature, whereas the deposit of metallic bismuth is not. However, I do not wish to be rigorously bound by this theoretical explanation, and my invention is offered on the basis of my empirical findings arrived at through actual experiments.

In using my dosimeter glasses, the linear response of their optical density at the 515 millimicron wave length to radiation dosage greatly simplifies the method of determining the dosage received by a specimen in any situation. For example, my glasses are especially useful when the gamma radiation source is a mixture of fission products in an irradiated fuel rod. It is, of course, far less expensive to employ sources of the latter kind since these do not require the complicated process of separating cobalt 60, or some other individual nuclide, out of a mixture of fission products.

When it is wanted to know the dosage received by a specimen from a gamma source of a spent reactor fuel rod, a disc of my dosimeter glass of known thickness is placed in the irradiation chamber in a position where it will receive the same dosage as the specimen; then on withdrawal of the disc and specimen together, the disc is heated to 130° C. for about an hour in order substantially to get rid of the interfering absorption bands as above explained, and an optical density reading at the 515 millimicron wave length is taken by an appropriate sensing device such as a spectrophotometer. From the optical density reading, the dosage received by the specimen may be readily determined by reference to a graph, such as that of the FIGURE, based on calculations of the dosage from a standard irradiated fuel rod similar to the one used in the irradiation chamber. It is understood, of course, that a different plot is required for each type of glass such as Si 104, and for each kind of source, but the principle is the same in any case.

In the event that it is desired to give to a specimen a predetermined gamma dosage, a plurality of discs may be suspended on wires adjacent the specimen, or some other arrangement made whereby they can be withdrawn as the irradiation proceeds. The discs are withdrawn singly at intervals, and as each is withdrawn, a reading at the 515 m$\mu$ wave length is made by a photometric sensing device. The heating to 130° C. is carried out if it is important to be certain that a minimum dosage has been received; on the other hand, if it is more important that a certain dosage not be exceeded, the heating step should be dispensed with in order to make a more prompt reading. Even without the removal of the interfering bands quite an accurate reading may be had at 515 m$\mu$, particularly at dosages of $10^6$ roentgens or over. When the reading indicates that the desired dosage has been received, the specimen is withdrawn from the chamber.

*Example*

90.86 g. of bismuth trioxide, 7.8 g. of sand, 72.34 g. of boric acid, 29.00 g. of lead monoxide, and 4.11 g. of arsenic trioxide were mixed together and sintered at about 500° C. for about one hour. The sintered mass was then melted in a platinum crucible with a platinum lid in a globar furnace at about 1230° C. for about 5½ hours. The glass was cast in copper molds as discs ¾" in diameter and about ⅓" thick, and these were put into an annealing oven heated to about 380° C. and cooled at the rate of 0.4° C. per minute. The annealed discs were ground and polished to 1 mm. and 3 mm. thicknesses.

The discs were then placed in an irradiation chamber in which gamma radiation was received from a cobalt 60 source for varying times. On withdrawal, they were heated to 130° C. for one hour and then their optical density at 515 mµ was taken by a Cary spectrophotometer. Their optical density was linearly proportional to the dosage received within the chamber.

It will be understood that this invention is not to be limited to the details given herein, but that it may be modified within the scope of the appended claims.

What is claimed is:

1. A melted and cast glass suitable for use as a gamma radiation dosimeter consisting of from about 15 to about 57 mole percent bismuth trioxide and from about 0.05 to about 0.20 mole percent of a member of class consisting of arsenic trioxide and antimony trioxide, the said glass being free of elemental metal.

2. A melted and cast glass suitable for use as a gamma radiation dosimeter consisting of a mixture having the proportions of 1.0 to 4.0 moles of $Bi_2O_3$, 3.5 to 4.5 moles of $B_2O_3$, zero to 1.0 mole of PbO, zero to 1.0 mole of $SiO_2$, and from 0.004 to 0.016 mole of a member of the class consisting of $As_2O_3$ and $Sb_2O_3$, the said glass being free of elemental metal.

3. A melted and cast glass suitable for use as a gamma radiation dosimeter consisting of a mixture having the proportion of 1.5 moles of $Bi_2O_3$, 4.5 moles of $B_2O_3$, 1.0 mole of PbO, 1.0 mole of $SiO_2$, and 0.016 mole of $As_2O_3$, the said glass being free of elemental metal.

4. A method for measuring gamma radiation dosage within a radiation chamber comprising placing a melted and cast glass disc consisting of from about 15 to about 57 mole percent bismuth trioxide and from about 0.05 to about 0.20 mole percent of a member of the class consisting of arsenic trioxide and antimony trioxide within the chamber, introducing gamma radiation into the chamber, withdrawing the glass disc from the chamber, heating the glass disc to 130° C. for one hour, and then reading the optical density of the disc by a photometric sensing device at a wave length of 515 millimicrons.

5. The method of claim 4 where the glass disc consists of a mixture having the proportion of 1.5 moles of $Bi_2O_3$, 4.5 moles of $B_2O_3$, 1.0 mole of PbO, 1.0 mole of $SiO_2$, and 0.016 mole of $As_2O_3$.

6. A method for giving a specimen a predetermined gamma radiation dosage consisting of placing the specimen in a radiation chamber and adjacent thereto a plurality of metal and cast glass discs consisting of from about 15 to about 57 mole percent bismuth trioxide and from about 0.05 to about 0.20 mole percent of a member of the class consisting of arsenic trioxide and antimony trioxide, introducing gamma radiation into the chamber, withdrawing the discs at intervals one at a time, then heating each disc as it is withdrawn at 130° C. for about one hour, then reading its optical density in a photometric sensing device at a wave length of 515 millimicrons, and on reaching a predetermined optical density withdrawing the specimen from the chamber.

References Cited in the file of this patent

UNITED STATES PATENTS

| | | |
|---|---|---|
| 2,584,975 | Armistead | Feb. 12, 1952 |
| 2,822,279 | Larson et al. | Feb. 4, 1958 |
| 2,853,393 | Beck et al. | Sept. 23, 1958 |
| 2,972,051 | Baum | Feb. 14, 1961 |

OTHER REFERENCES

Measuring High Dosage by Absorption Changes in Glass by Schulman et al., Nucleonics, vol. 13, No. 2, February 1955, pages 30 to 33.

Glass Dosimetry by Goldblith, Nucleonics, vol. 14, No. 1, January 1956, pages 34 to 39.

Recent Developments in Glass Dosimetry by Kreidl et al., Nucleonics, vol. 14, No. 3, March 1956, pages 82 and 83.